United States Patent [19]

Lowe

[11] 3,882,538

[45] May 6, 1975

[54] MULTIPLE ACCESS MESSAGE RETRIEVAL SYSTEM

[75] Inventor: Virgil L. Lowe, Alexandria, Va.

[73] Assignee: Edutron, Incorporated, Gainesville, Fla.

[22] Filed: Aug. 31, 1973

[21] Appl. No.: 393,335

Related U.S. Application Data

[63] Continuation of Ser. No. 129,470, March 30, 1971, abandoned.

[52] U.S. Cl. ........ 360/9; 179/15 BW; 179/15.55 R; 360/20; 360/72; 358/4

[51] Int. Cl. ............................................ H04n 5/78

[58] Field of Search ........ 178/6.6 A, 6.6 R, 5.4 CD; 179/100.2 MD:100.4 ST, 1 SA, 1 SM, 15 AC, 15 BM, 15 FD, 15.55 R, 15.55 T, 15 BW; 360/20, 24, 72, 8, 9; 358/4

[56] References Cited

UNITED STATES PATENTS 3,637,940 1/1972 Morchand ..................... 179/15 BM

*Primary Examiner*—James W. Moffitt
*Attorney, Agent, or Firm*—Morton, Bernard, Brown, Roberts & Sutherland

[57] ABSTRACT

A multiple access message retrieval system. Messages are segmented and the segments are frequency multiplexed to give a signal of a duration equal to the segment duration. The frequency multiplexed and segmented message can be frequency multiplexed with other such messages and the resulting signal recorded for playback at any desired time. On playback the signal is provided to a message selector which passes a preselected one of the frequency multiplexed segmented messages to a plurality of user locations, each equipped with a control unit that enables the user to select the segment of the message provided to his location at any given time. Thus, the user can step ahead in the message if he desires to skip part of it, or he can step back if he desires to have a part repeated for him, all without affecting the signals received at the other user locations. If the system is used, for example, in a classroom or language laboratory, the message can include questions, and the system can respond to a correct answer from the student by proceeding with the lesson and to an incorrect answer by returning to an earlier point in the lesson.

25 Claims, 7 Drawing Figures

INVENTOR
VIRGIL L. LOWE

BY Morton, Bernard, Brown, Roberts & Sutherland
ATTORNEYS

MULTIPLE ACCESS MESSAGE RETRIEVAL SYSTEM

This is a continuation of application Ser. No. 129,470, filed Mar. 30, 1971, and now abandoned.

The present invention pertains to an information storage and retrieval system. More particularly, the present invention pertains to a multiple access information storage and retrieval system capable of storing a plurality of messages and, within a limited range, permitting simultaneous access to any point of any of the messages from each of the access points.

In numerous situations it is desired to be able to provide prerecorded messages to a plurality of locations with users at the different locations able to select the particular message and the particular portion of that message which they receive. Such usage might be desired, for example, in classrooms and language laboratories where prerecorded lessons can be provided to a large number of students each in an individual receiving location having its own receiving equipment. Students in such situations learn at different rates, however, and often one student may wish to have a portion or all of a lesson repeated so that he can more thoroughly study it. It is desirable for such a student to be able to have that portion of the lesson which is of particular interest to him repeated at his receiving location without causing it to be repeated for the other students, since repeating it for everyone would hold back those students who have already mastered that portion of the lesson. Each student could, of course, be given his own recording of the lesson and his own playback equipment, but this approach is quite obviously very expensive and cannot be implemented in most situations.

It is further desirable when using prerecorded lessons to be able to interrogate the students in order to determine how well they have grasped the material which has been presented before proceeding to more advanced material. Each student could be quizzed by an instructor, but with a large class this approach would result in holding up students while their responses were evaluated by the instructor.

The present invention is a multiple access information retrieval system capable of providing simultaneously to a plurality of locations a large number of prerecorded messages, with the recipient at each location capable of selecting the particular message provided to him and capable of controlling the portion of the message which is presented to him at any one time so that he may step ahead to an advanced portion of the message or step backward to repeat a portion of the message. The message might be, for example, a lesson provided to a classroom or a language laboratory. In such event the message might include questions designed to determine the student's grasp of the material which has been presented, and the present invention can cause the presentation of material to be suspended until the student has provided the proper response to such questions. In addition, should the student provide an incorrect response, the present invention is capable of automatically returning to a preselected portion of the lesson to repeat for the student the material from which the correct answer can be found.

In accordance with the present invention a message is divided into short segments, for example, segments each of a ten-second duration, and these short segments are frequently multiplexed to provide a single recording of, for example, ten seconds containing the several segments each at a unique frequency, for example 10 kilohertz apart. A plurality of messages can be frequency multiplexed in this manner, and the resulting plurality of recordings can likewise be frequency multiplexed to provide a single short duration frequency multiplexed recording containing the several messages each in frequency multiplexed segments. The recorded messages might be simply audio signals, or they might include both audio and video portions. The several segmented frequency multiplexed messages are provided to one or a plurality of receiving locations, each equipped with frequency selective means permitting selection of the desired multiplexed message. From that message selector the selected multiplexed message is applied to one or a plurality of utilizing locations, each including control means for determining the particular segment, of for example ten seconds duration, of the frequency multiplexed message which is received at that particular utilizing location at any instant of time. Both audio and video outputs can be provided to each utilizing location. If desired, the message selector can select several of the multiplexed messages with each utilizing location determining not only which one of the selected messages is provided to it, but also which segment of that particular message. Likewise, of course, the message selector can have incorporated into it the segment control equipment so that in essence an entire classroom becomes a single utilizing location.

These and other aspects and advantages of the present invention or more apparent in the following detailed description and claims, particularly when considered in conjunction with the accompanying drawings in which like parts bear like reference numerals. In the drawings:

Figure 1:
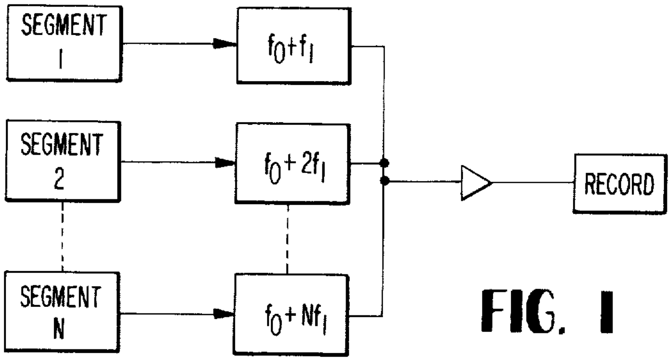
FIG. 1 is a block diagram depicting recording apparatus in accordance with the present invention.

FIG. 1 depicts one embodiment of recording apparatus in accordance with the present invention in which a message is divided into segments each having a duration in the order of, for example, ten seconds. The message segments are each recorded at a unique frequency, for example ten kilohertz apart (i.e. $f_1 = {}_{10}$ Khz.), and these recordings are multiplexed to provide a final recording which in a representative example may have a duration of ten seconds with the several segments recorded thereon each at its unique frequency.

Figure 2:
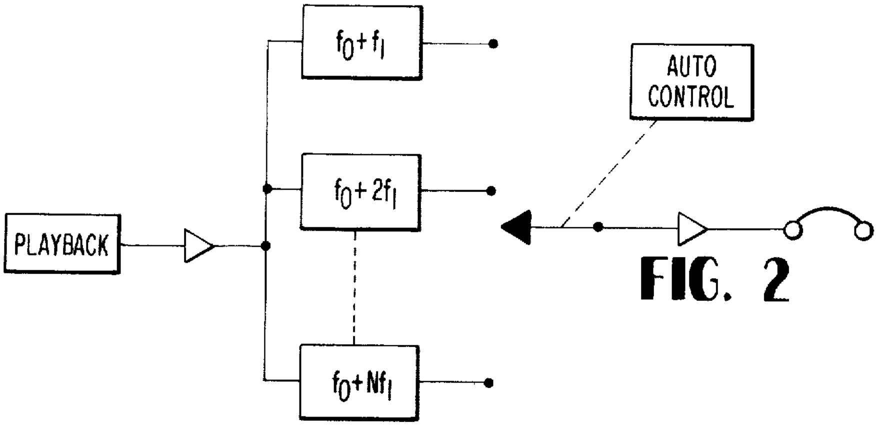
FIG. 2 is a block diagram depicting playback apparatus in accordance with the present invention.
Figure 3:
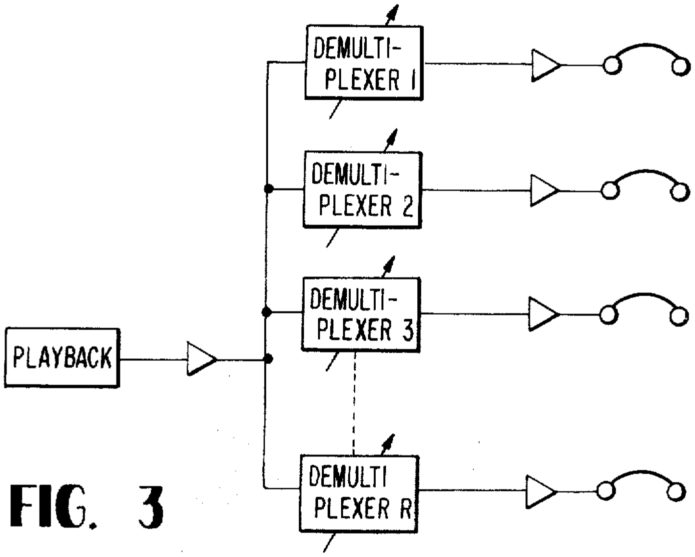
FIG. 3 is a block diagram depicting a modified embodiment of playback apparatus in accordance with the present invention.

FIG. 2 depicts one embodiment of apparatus for playing back the recording generated with the apparatus of FIG. 1. The ten second multiplexed recording is repeatedly played back and applied to the demultiplexer having amplifying and filtering circuits tuned to the several frequencies. Each filter circuit therefore provides as an output one of the recorded segments. Each output station includes an output device such as a set of earphones the input to which is connected to a switching device to permit the user to select the particular segment which he desires. If, for example, the user sets his switch to the first segment, then he receives that segment and at its completion the switching device automatically steps to the next segment. At the conclusion of that segment, the switching device automatically steps to the next segment, etc. As a consequence, the user receives the complete message. Should the user desire to have a segment repeated, he manually sets the switching device to the segment preceding the desired segment, and the beginning of the desired segment is available to him within ten seconds. FIG. 3 depicts an alternative playback apparatus in which each user is provided with a manually controllable demultiplexer.

Figure 4:
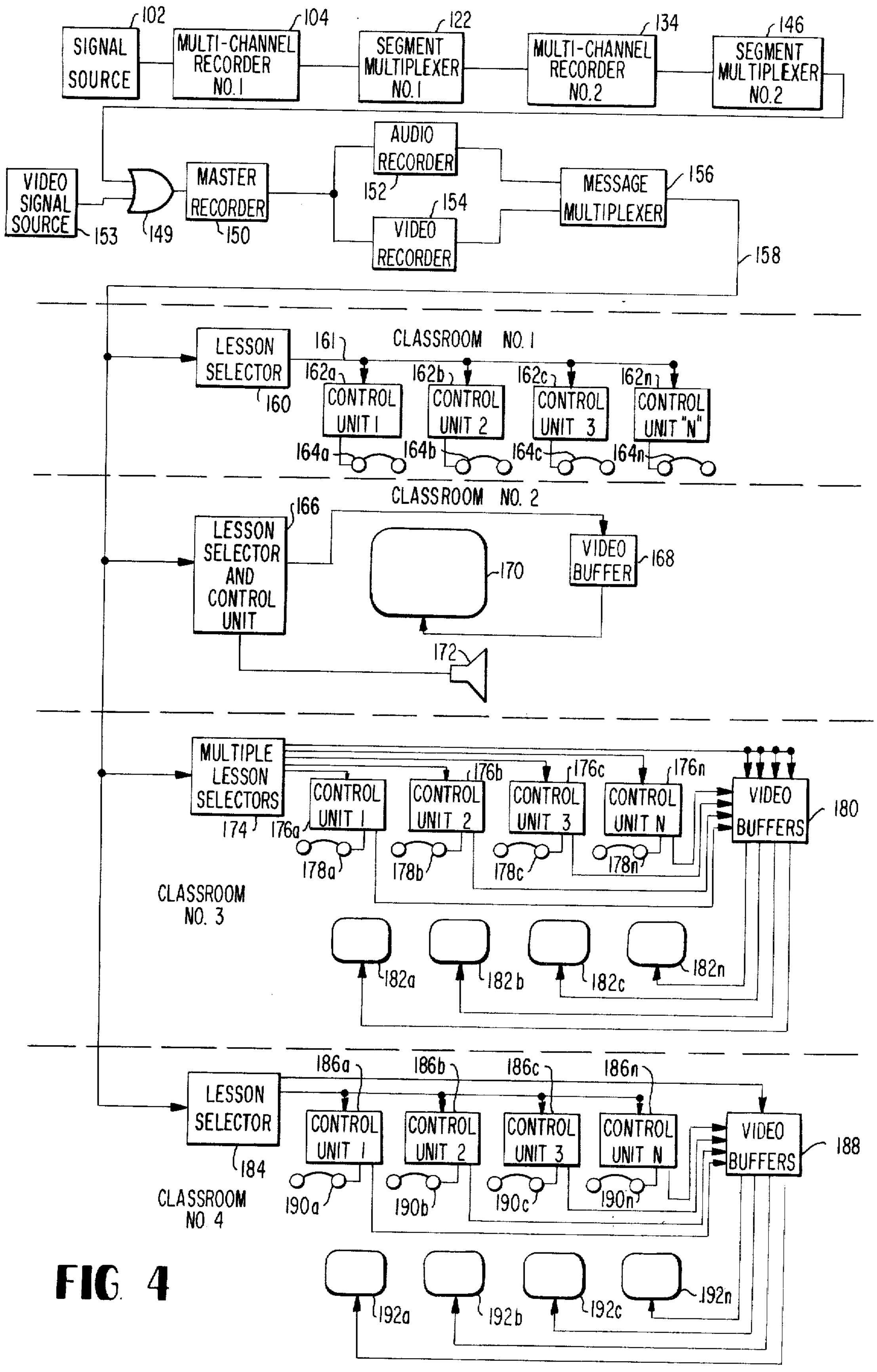
FIG. 4 is a block diagram depicting in greater detail recording and playback apparatus in accordance with the present invention.
Figure 5:
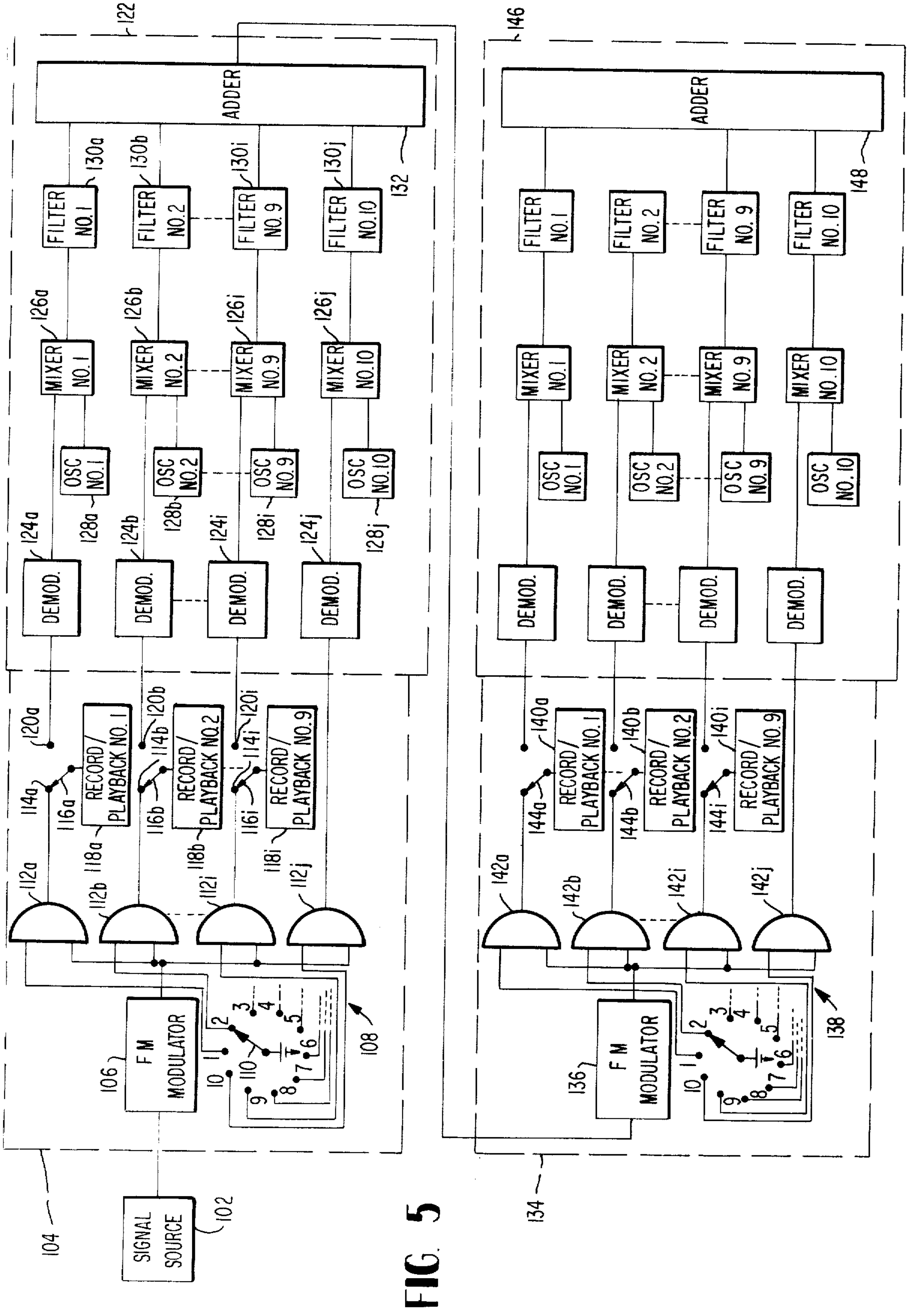
FIG. 5 is a block diagram of components of the recording apparatus of FIG. 4.

FIG. 4 provides a more detailed block diagram of apparatus in accordance with the present invention. The recording portion of this apparatus includes signal source 102 which by way of example might be a microphone or a recorded message. The signal from source 102 is applied to a first multi-channel recorder 104 which records each segment of the message on a separate channel. By way of example, multi-channel recorder 104 might be a disk recorder capable of recording on a plurality of channels and capable of playing back recordings on the several channels either individually or in parallel. Alternatively, any other type of recorder having this same multi-channel capability could be utilized. As illustrated in FIG. 5, in an illustrative embodiment of apparatus suitable for use as the first multi-channel recorder 104, FM modulator 106 has its input connected to signal source 102 and its output applied through gated switching means 108 to a plurality of record/playback units, one associated with each segment which is to be recorded. Gated switching means 108, by way of example, can include a switch 110 having a position for each channel of multi-channel recorder 104 and in each position of the switch enabling a unique AND gate 112. The enabled gate passes the message segment to associated fixed contact 114 of an associated single-pole-double-throw switch 116. With the moving contact of switch 116 closed against fixed contact 114, the output of gate 112 is applied to an associated record/playback unit 118. Switches 116 and record/playback units 118 are provided for all but the last channel of multi-channel recorder 104. By way of illustration each record/playback unit **118*a*–118*i* can include a multi-track disk recorder capable of recording on each side of a disk and having a record/playback head on each side of the disk. Then, with such a disk rotating at, e.g., 10 revolutions per second, a ten-second message can be recorded on tracks on alternate sides of the disk with a record/playback head stepping to the next track on its side of the disk while a track on the opposite side is being recorded or played back. The ten-second message would then require 50** tracks on each side of the disk.

In the illustrative embodiment of FIG. 5, each of the first nine segments into which the message is to be divided is recorded on an uniquely associated channel within multi-channel recorder 104. To accomplish this, each switch **116*a*–116i, associated respectively with the first through the ninth record/playback units 118*a*–118i, is closed against the associated first fixed contacts 114*a*–114*i*. Switch 110 is closed against its Segment 1 contact to enable the Segment 1 gating means 112*a*. The first segment of the message is therefore applied through gating means 112*a* and switch 116*a* to the first record/playback unit 118*a*. After ten seconds switch 110 steps to its Segment 2 contact so that the recorded message then no longer passes through gating means 112*a* but instead passes through gating means 112*b* and switch 116*b* to the second record/-playback unit 118*b*. After ten seconds switch 110 again steps to the next segment contact, and the next segment is recorded on the next record/playback unit. Preferably, switch 110 and all of the switches 116*a*–116*i* are solid state switches having rise times in the order of one microsecond. The ninth ten-second segment of the message is applied through gating means 112*i* and switch 116*i* to the ninth record/playback unit 118*i*. Then each of the switches 116*a*–116*i* closes against its respective fixed contact 120*a*–120*i*, and switch 110 closes against its Segment 10 contact so that as the tenth segment of the message is being applied through gating means 112*j*, segments 1–9 are being played back from the Segment 1-Segment 9 record/-playback units 118*a*–118*i* and the associated switches 116*a*–116*i*. Alternatively, each of the record/playback units 118*a*–118*i* can normally be maintained in a playback condition with the switches 116*a*–116*i* closed against their respective contact 120*a*–120*i* except when a segment is being recorded on an associated record/-playback unit 118*a*–118*i* during which time that associated switch 116*a*–116*i* is closed against its associated contact 114*a*–116*i***.

As depicted in FIG. 4, these segments of signals from recorder 104 are applied to the first segment multiplexer 122 which is also depicted in a more detailed block diagram in FIG. 5. Each segment of the message is applied through an associated demodulator **124*a*–124*j* to the first input of an associated mixer 126*a*–126*j*. The second input of each of the mixers 126*a*–126*j* is connected to an associated oscillator 128*a*–128*j*. Oscillators 128*a*–128*j* provide outputs differing in frequency by the frequency difference desired between the adjacent segments in the multiplexed signal, for example 10 kilohertz. The hetrodyned outputs of mixers 126*a*–126*j* are applied to associated filters 130*a*–130*j* which pass the respective difference frequencies to adder 132** which by way of example may be a simple resistive adder network.

As seen in FIG. 4, the output from segment multiplexer 122 is then applied to the second multi-channel recorder 134 which as depicted in FIG. 5 can be identical with the first multi-channel recorder 104. Within recorder 134 this multiplexed signal from adder 132 is applied through FM modulator 136 and gated switching means 138 to record/playback units 140. The first multiplexed signal made up of the first 10 segments of the segmented message thus passes through gating means **142*a* and switch 144*a* to the first record/-playback unit 140*a*. This takes place during the application of the tenth segment from signal source 102 to recorder 104. Segments 11–19 are then recorded in recorder 104. During the application of Segment 20 from signal source 102, segments 11–20 are applied through the first segment multiplexer 122 to the second multitrack recorder 134 wherein they pass through modulator 136, gating means 142***b* and switching means 144*b* to the second record/playback unit 140*b* in which the multiplexed signal is recorded. In like manner segments 21 through 90 are recorded within recorder 134, with ten segments being recorded as a multiplexed signal on each record/playback unit 140*c*–140*i*. Segments 91–99 are then recorded on record/playback units 118*a*–118*i* of recorder 104. During the application of the one-hundredth ten-second segment from signal source 102, switches 116*a*–116i are closed against contacts 120*a*–120*i*, respectively, applying that signal through multiplexer 122 to recorder 134 in which it is applied to gating means 142*j*. Switches 144*a*–144*i* in recorder 134 are closed against their respective second contacts, and so the complete multiplexed signal is applied by the second multi-channel recorder 134 to the second segment multiplexer 146, as depicted in FIG. 4. As seen in FIG. 5, multiplexer 146 can be identical with multiplexer 122 with the exception of the oscillator frequencies, which in multiplexer 146 might differ by 100 kilohertz, and as a result a multiplexed signal of the entire one hundred segments is obtained from adder 148 of multiplexer 146.

As seen in FIG. 4, the multiplexed signal is applied from segment multiplexer 146 through OR gate 149 to master recorder 150 which records the message as a ten-second multiplexed signal. The signal from source 102 might be an audio signal that is made up of, for example, one hundred segments each of a ten-second duration and multiplexed into a ten-second signal that is applied by master recorder 150 to multi-channel audio recorder 152 in which it is recorded on one channel. Recorder 152 can be, for example, a multi-channel disk recorder which is capable of recording on a plurality of channels and capable of playing back recordings on the several channels either individually or in parallel. If the audio lesson from signal source 102 is to be accompanied by video, the video signals are applied at a separate time from video signal source 153 through OR gate 149 to master recorder 150, preferably at a time so that the audio signals of a lesson and the corresponding video signals are recorded adjacent each other in master recorder 150. By way of example, the video signal might be made up of one hundred video frames which could be recorded as a three-and-one-third second signal. This video signal is applied by master recorder 150 to multi-channel video recorder 154 and is recorded on one channel thereof. Alternatively, the video signal from source 153 can be applied directly to video recorder 154, bypassing master recorder 150, while the multiplexed audio signal from adder 148 is applied directly to audio recorder 152. Video signal source 153, for example, could be a television camera or a video recorder. Again recorder 154 is a multi-channel recorder having a plurality of tracks per channel such as a disk recorder capable of recording on any of a plurality of tracks within the plurality of channels and capable of playing back recordings on the several channels either individually or in parallel. Recorders 152 and 154 can have a plurality of messages on them in the form of a ten-second multiplexed signal on recorder 152 and of 100 sequential video frames on recorder 154.

If, for example, the apparatus is utilized to provide prerecorded lessons to classrooms, recorder 152 might have twenty lessons recorded thereon each of a maximum duration of sixteen minutes and forty seconds and each recorded in the form of a ten-second multiplexed signal. Recorder 154 would have recorded thereon the corresponding video frames for the twenty lessons. These lessons are applied by recorders 152 and 154 through message multiplexer 156 to output line 158 which provides them to utilizing locations such as classrooms. Recorders 152 and 154 and message multiplexer 156 can be of the same general configuration as recorder 104 and multiplexer 122 as shown in FIG. 5 or message multiplexer 156 could for example be similar to a community antenna television modulator. Alternatively, a third or fourth multiplexing step could follow segment multiplexer 146 so that, for example, four 16-minute-40-second messages could be segmented and stored on a wide bandwidth recorder and transferred simultaneously to master recorder 150 as a single message consisting of, for example, 400 multiplexed segments or as a plurality of messages consisting of a total of 400 multiplexed segments. Also an audio/video disk recorder rotating at, for example, 1,800 rpm and permitting the recording of ten seconds of a wide bandwidth video or audio analog signal on any of its channels could be substituted for audio disk recorder 152 and video disk recorder 154.

The utilizing locations might include a variety of capabilities and several illustrative examples are depicted in FIG. 4. While FIG. 4 illustrates the lesson being applied directly from message multiplexer 156 to the utilizing locations or classrooms, the multiplexed message could be recorded, stored for some time, and played back to the utilizing locations, as depicted in FIGS. 1, 2 and 3. Thus, for example, lesson selector 160 in Classroom No. 1 receives the plurality of messages as a multiplexed signal from line 158 and includes suitable equipment for permitting the selection of a desired audio lesson and application of that audio lesson to the several utilizing locations within that classroom. Lesson selector 160 thus can comprise a band pass filter with frequency characteristics controllable to permit selection of the desired multiplexed audio lesson and application of that lesson through it to the utilizing locations. Alternatively, lesson selector 160 could include a circuit for mixing the signal on line 158 with another signal of frequency dependent upon the lesson to be selected. The difference frequency in the resulting heterodyned output would then be applied through a fixed frequency band pass filter to the utilizing locations. Since Classroom No. 1 illustrates usage of only an audio signal, each utilizing location is provided with a control unit 162 and an audio output device such as earphones 164. The control unit permits the user or student to select that portion of the lesson which he receives via his earphones 164. Thus, for example, when he commences a lesson the student adjusts his control unit 162 to the beginning of the lesson, for example by depressing, a Start button, and within ten seconds the beginning of the lesson is available to him. Since the lesson in multiplexed form is repeated each ten seconds on line 161, a maximum delay of ten seconds occurs before the beginning of the lesson is available to the student, and every ten seconds his control unit steps to the next segment. Should the student desire to have a portion of the lesson repeated for him, he adjusts his control unit until he is receiving the desired portion. Consequently, each student is able to control for himself the portion of the lesson he receives without interfering with other students.

Classroom No. 2 depicted in FIG. 4 illustrates a situation in which the signal-utilizing locations are provided with both audio and video outputs. The multiplexed messages on line 158 are applied to a combined lesson selector and control unit 166. The desired frame of the selected video signal is passed to video buffer 168 in which that desired frame is stored for application to video screen 170. The video frame stored in video buffer 168 is updated each three-and-one-third seconds under the control of lesson selector and control unit 166. The desired segment of the selected audio signal is passed to loudspeaker 172.

Classroom No. 3 depicted in FIg. 4 includes a multiple lesson selector 174 which permits the application of a different lesson to each control unit 176 in that classroom. The selected segment of the audio output is applied by each control unit 176 to its corresponding output device such as earphones 178. The corresponding video signals are applied to video buffers 180, and the control units 176 send the necessary control signals to the video buffers 180 to cause the video buffers to record the desired video frames of the selected lessons for each control unit 176 and to apply those video frames to the corresponding display screens 182 associated with the control units. Control units 176 apply the necessary synchronization and keying signals to video buffers 180 to maintain the proper video/audio synchronization. Classroom No. 4 is similar to classroom No. 3 except that the same lesson is provided to each control unit within classroom No. 4. Consequently, the same multiplexed audio signal is applied from lesson selector 184 to each control unit 186, and a single video signal is applied from lesson selector 184 to video buffers 188, with each video buffer storing the frame corresponding to the audio segment provided by the respective control unit to the respective earphones or other audio output device. The control units 186 determine which segment of the audio signal is provided to output device 190 and which frame of the video signal is provided from video buffers 188 to display screens 192. It is thus apparent that in accordance with the present invention numerous classroom capabilities can be provided.

The present invention can be utilized to transmit lessons over a closed circuit television system or over a community antenna television system. Thus, for example video signals can be transmitted over alternate television channels, e.g., channels 3, 5, 7 . . . 83, with multiplexed audio signals transmitted over the intervening channels, i.e., 2, 4, 6, etc. The six megahertz television channel bandwidth accommodates the video signals within the system of the present invention. The multiplexed audio signals within the system of the present invention can readily be accommodated by a one megahertz bandwidth, and so each television channel can include six audio subchannels, or preferably five audio subchannels with a ½ megahertz unused portion on each end of the channel bandwidth to assure against interchannel interference. By this means an entire community antenna television system including for example a school system, homes, industry, etc., can be served by a single system in accordance with the present invention.

Figure 6:
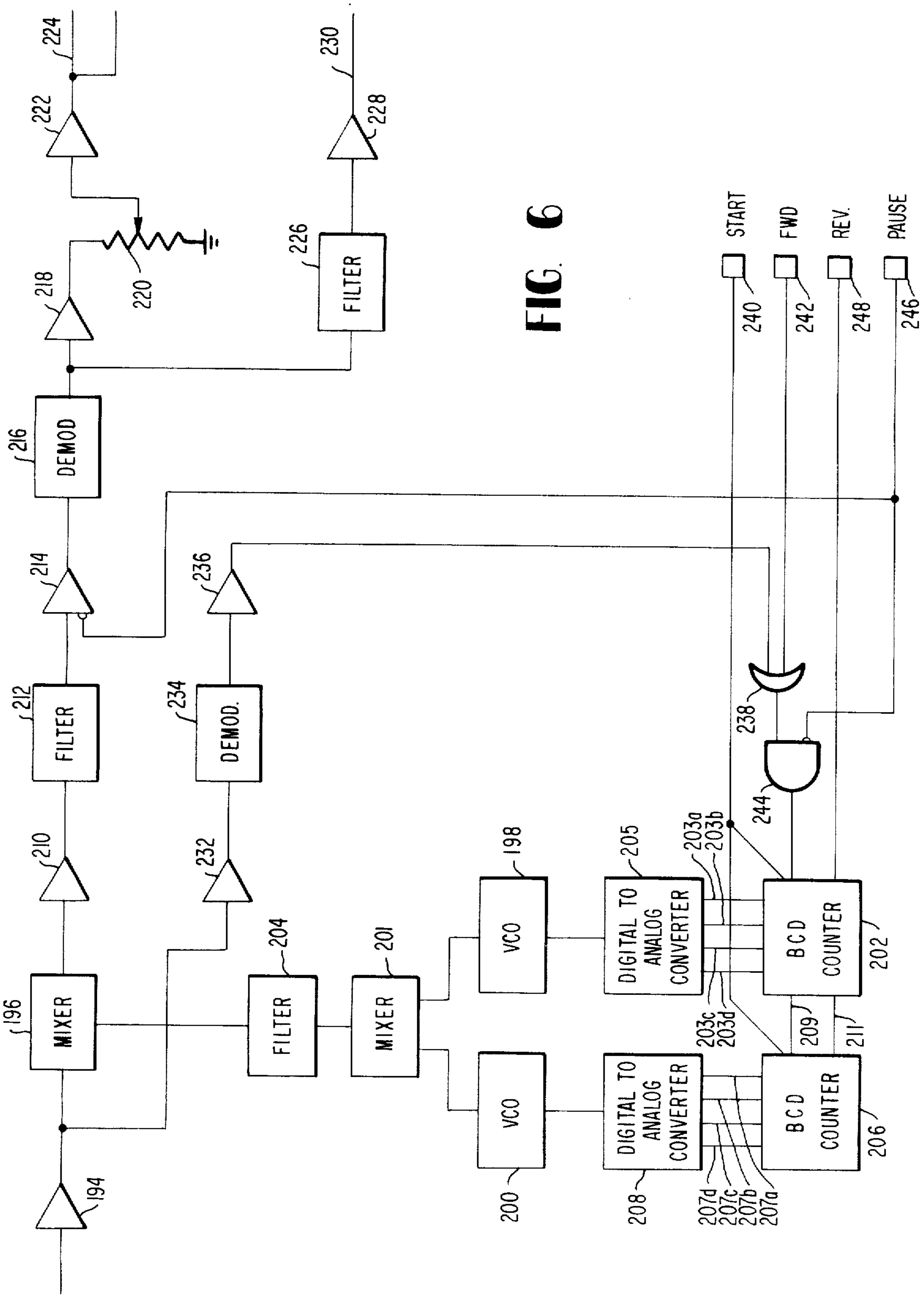
FIG. 6 is a block diagram of a control unit suitable for use within the playback apparatus of FIG. 4.

FIG. 6 depicts circuitry suitable for use as control units for selecting the segment of a message to be provided to the audio and video output devices. The multiplexed signal is applied from the lesson selector through amplifier 194 to one input of mixer 196. The second input of mixer 196 is a signal of a frequency which results in the selection of the desired segment of the multiplexed signal. Voltage controlled oscillator (VCO) 198 and VCO 200 have their outputs mixed within mixer 201, and the resulting sum or difference signal is passed by filter 204 to the second input of mixer 196. By way of illustration VCOs 198 and 200 can each be controlled by a voltage developed in a binary coded decimal (BCD) manner. Thus BCD counter 202 provides on its output lines 203*a*, 203*b*, 203*c* and 203*d* output voltage signals which are binary representations of digital numbers. These outputs are applied to digital to analog converter 205, the output of which is an analog voltage that is utilized to control VCO 198. Likewise, BCD counter 206 provides voltage outputs in BCD manner on its output lines 207*a*, 207*b*, 207*c* and 207*d* to digital to analog converter 208 the output of which is utilized to control VCO 200. The outputs from BCD counters 202 and 206 indicate which of the 100 segments of the multiplexed message is to be provided. Thus, if the 38th segment is desired, voltages are applied on lines 207*a*, 207*b* and 203*d*, indicating the BCD numbers 3 and 8, or 38. Filter 204 thus provides a signal of a frequency indicating that the 38th segment of the multiplexed signal lesson selected by the lesson selector from those available on line 158 is to be provided by the control unit to the output device. If the consecutive message segments are multiplexed at frequencies differing by 10 kilohertz, then each time BCD counter 202 is incremented to indicate that the next higher-numbered segment is desired, the output frequency of VCO 198 increases by ten kilohertz, and each time BCD counter 206 is incremented, the output frequency of VCO 200 increases by 100 kilohertz.

The output from mixer 196 is applied through amplifier 210 to filter 212 which passes the sum or difference frequency of the heterodyned mixer output. This frequency passes through amplifier 214 to demodulator 216 the output of which is applied through amplifier 218, volume control 220 and output amplifier 222 to output line 224 which is connected to the output device such as a pair of earphones. If desired a second output line can be provided from amplifier 222, as indicated in FIG. 6, to permit the output to be applied to another device such as a tape recorder. The output from demodulator 216 is also applied to filter 226 which passes video control signals through amplifier 228 to output line 230 which applies the video control signals to the appropriate video buffer circuitry to cause the corresponding video frame to be stored therein for display on the corresponding video output display device.

The multiplexed lesson selected from the signal on line 158 includes synchronization signals to indicate the beginning of each ten-second segment. The output from amplifier 194 is applied through amplifier 232 to demodulator 234 which passes these synchronization signals through amplifier 236 to one input of OR gate 238. Four switches are utilized in conjunction with these synchronization signals to control the selection of the desired signal segment. BCD counters 202 and 206 receive a reset signal from START control 240 which can be a momentary contact switch. This signal resets the voltage generators to provide a BCD zero output. FORWARD control 242, which is also a momentary contact switch, is connected to the second input of OR gate 238, the output of which is connected to the non-inhibiting input of INHIBITED-AND gate 244. The inhibiting input of gate 244 is connected to PAUSE control 246 which is a single-pole-single-throw switch. The output of gate 244 is connected to the UP input of BCD counter 202. REVERSE control 248, which is a momentary contact switch, is connected to the DOWN input of BCD counter 202.

Under normal operation PAUSE control 246 is open, and so gate 244 is uninhibited. To start a message at its beginning, START control 240 is depressed. This resets BCD counters 202 and 206 to provide a BCD zero output, and so the output of filter 204 is a signal of a frequency which indicates that system is to be set to its start condition in which the first segment of the message is commenced at the beginning of the next ten-second segment. At the beginning of that next ten-second segment, a pulse from amplifier 236 passes through gates 238 and 244 to step BCD counter 202 to a one output. VCO 198 therefore changes its frequency, and so the signal from filter 204 changes to a frequency which indicates that the first segment of the selected lesson is desired. Consequently, filter 212 passes only the first segment, and so that desired segment of the multiplexed signal is available to the output device. At the end of the first segment, the synchronization signal which is included in the output from amplifier 194 is applied from demodulator 234 through amplifier 236, OR gate 238 and INHIBITED-AND gate 244 to the UP input of BCD counter 202. Consequently, the voltage output changes to a BCD two representation, increasing the frequency of VCO 198. Therefore, the output from filter 204 changes to a frequency which results in the second segment of the message being passed by filter 212. Operation continues in this manner until the ninth segment or the lesson or message. At the end of the ninth segment of the message, BCD counter 202 is incremented from nine to zero and applies a carry output signal on line 209 to the UP input of BCD counter 206, incrementing the ten's digit of the selected signal segment, and operation continues through the remainder of the message.

If the user desires to advance the message to a segment ahead of that which he is receiving, he depresses FORWARD switch 242. This applies a pulse through gates 238 and 244 to the UP input of BCD counter 202, thereby advancing the system to the next segment of the message. Likewise, if the user desires to go back to an earlier portion of the message, for example to have an earlier portion of the message repeated, he depresses REVERSE control 248 which applies a pulse to the DOWN input of BCD counter 202, and as a consequence the signal from filter 204 is altered to a frequency which results in the next preceding segment being passed by filter 212. The user can depress control 248 as many times as necessary to return the message to the desired segment. Thus, for example, if he desires to go back 40 seconds in the message, he depresses REVERSE control 248 four times. Suitable connection from the BCD counter 202 Borrow output to the DOWN input of BCD counter 206 via line 211 permits counter 206 to be reversed as desired. If the user desires to study a particular video display, he depresses PAUSE control 246 which applies a signal to the inhibiting input of INHIBITED-AND gate 244 and to the muting input of amplifier 214. As a consequence signals are no longer applied to the UP input of BCD counter 202, and so the segment is retained, and the video control signals and audio output signals are muted so that no audio output is provided and the video frame stored within the video buffer continues to be displayed on the video display device. Should it be desired to have a message of a duration greater than the sixteen minute forty second (1,000 seconds) duration that can be provided with the control unit of FIG. 6, either a third multiplexing step, such as depicted in FIG. 5, can be conducted to provide a maximum message length of 166 minutes and 40 seconds (10,000 seconds) or the carry output from BCD counter 206 can be utilized to step the message selector to the next message.

Figure 7:
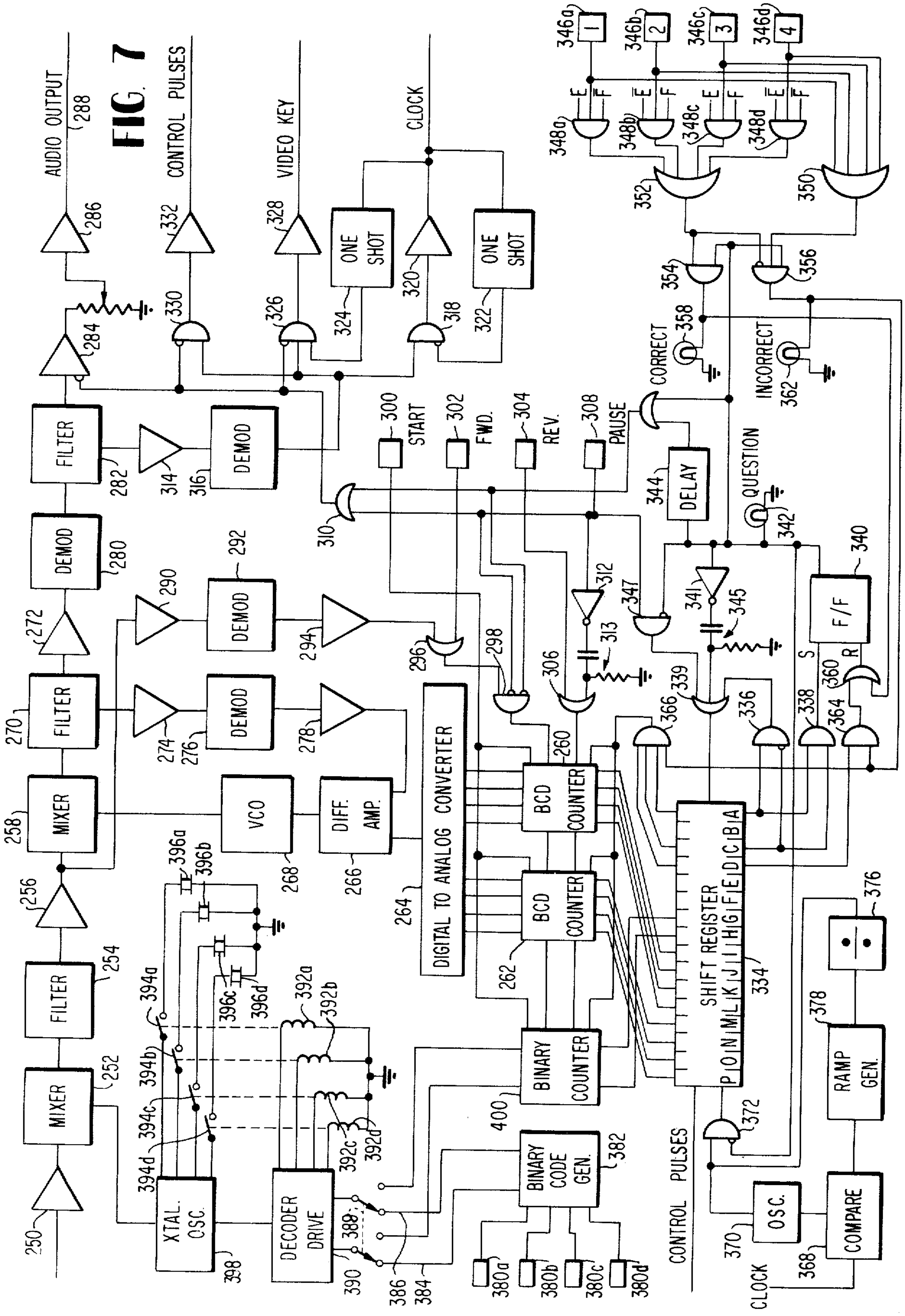
FIG. 7 is a block diagram of another embodiment of a control unit suitable for use in the present invention and permitting halting of the message while a question is answered by the student and return of the message to a different segment should the student give an incorrect answer.

FIG. 7 depicts a control unit capable of presenting questions at the utilizing location and of stopping the lesson until the student has provided a correct answer. The multiplexed audio signal is applied from the lesson selector through amplifier 250, mixer 252, filter 254, and amplifier 256 to one input of mixer 258. The second input to mixer 258 is a signal of a frequency which results in the selection of the desired segment of the multiplexed signal. BCD counters 260 and 262 provide output voltage signals which are binary representations of digital numbers representing the selected segment of the lesson. These output signals are applied to digital-to-analog converter 264 the output of which is an analog voltage that is applied to difference amplifier 266. The output of difference amplifier 266 is connected to voltage controlled oscillator 268 the output of which is a voltage of a frequency indicative of the desired segment of the multiplexed message. The output from VCO 268 is applied to the second input of mixer 258, and the resulting sum or difference signal is passed through filter 270 to amplifier 272. Filter 270 also applies a signal through amplifier 274 to demodulator 276 which passes an automatic frequency control (AFC) signal through amplifier 278 to the second input of difference amplifier 266. Use of this AFC signal permits a looser tolerance in the various circuit components. The output of amplifier 272 is applied to demodulator 280 which passes a signal to filter 282. The resulting audio frequency signal is applied to amplifier 284 the output of which passes through volume control amplifier 286 to output line 288 which can be connected to a suitable output device such as earphones.

Segmented synchronization signals in the output from amplifier 256 are passed through amplifier 290 to demodulator 292 the output of which passes through amplifier 294 and OR gate 296 to the noninhibiting input of INHIBITED-AND gate 298. The output of gate 298 is connected to the UP input of BCD counter 260. Four control switches are utilized with the control unit. START control 300, which can be a momentary contact switch, is connected to the reset inputs of BCD counters 260 and 262 to reset those counters to a BCD zero. FORWARD control 302 is connected to the second input of OR gate 296, and each time control 302 is depressed while gate 298 is not inhibited, the counter output is incremented to step the message to the next segment. REVERSE control 304 is connected to one input of OR gate 306, the output of which is connected to the DOWN input of BCD counter 260. Counter 260 has its carry and borrow outputs connected to the UP and DOWN inputs respectively of BCD counter 262. PAUSE control 308 is connected to one inhibiting input of INHIBITED-AND gate 298 and to one input of OR gate 310 and is coupled through inverter 312 and differentiator 313 to the second input of OR gate 306. The output of gate 310 is tied to the muting input of amplifier 284. Each time REVERSE control 304 is depressed, the output from BCD counters 260 and 262 is stepped back to increment the message back to the next preceding segment. Likewise, this stepping back occurs when PAUSE control 208 is released. This is to ensure that no portion of the message segment is skipped because the continuously repeating message is at a later point in its ten-second segment when PAUSE control 308 is released than it was at the time the PAUSE control was activated. Thus, upon release of the PAUSE control the message steps back one segment and repeats up to 20 seconds (or more accurately 19.999 seconds) of the message.

Control signals included with the audio signal and received from the message selector are passed by filter 282 through amplifier 314 to demodulator 316. Video signals are recorded by video recorder 154 as a three-and-one-third second multiplexed signal, and each three-and-one-third second segment includes 100 video frames. Thus each frame comprises 33⅓ milliseconds (ms) of the three-and-one-third second segment, and thirty frames are available per second. The control signals passed by demodulator 316 are related to this 33⅓ ms time. Accordingly, the entire system can be timed from a standard television synchronization generator. The control signal in the output from demodulator 316 is a coded series of pulses at a 960 pulse per signal pulse rate, and so there are 32 control pulse periods per video frame. These thirty-two pulse periods will be referred to as a control pulse frame. In this illustrative example of control of the system, each control pulse frame might include up to sixteen pulse in the first 16 control pulse periods of each control pulse frame, followed by sixteen blank control pulse periods. The first pulse of each control pulse frame passes through INHIBITED-AND gate 318 to amplifier 320, and the trailing edge of that pulse triggers monostable multivibrator or one-shot 322 to apply a thirty ms signal to the inhibiting input of INHIBITED-AND gate 318, thereby blocking the remaining pulses of that control pulse frame. The trailing edge of the pulse from amplifier 320 also triggers one-shot 324 which applies a one ms pulse to one noninhibiting input of INHIBITED-AND gate 326. Assuming there is no signal on the inhibiting input of gate 326, the second pulse of the control pulse frame is thus enabled to pass through gate 326 to amplifier 328. The output of amplifier 328 is the video frame keying signal applied to the video buffer units to indicate the selection of a video frame. During the remaining pulses of the control pulse frame both gate 318 and gate 326 are blocked.

The pulses from demodulator 316 pass through INHIBITED-AND gate 330, when there is no signal on its inhibiting input, and through amplifier 332 to provide pulses to control operation of the unit in response to answers given by the student to questions presented to them.

Shift register 334 includes sixteen stages designated in FIG. 7 as stages A through P. The control pulses from amplifier 332 are shifted into shift register 334. When a full complement of sixteen pulse periods, each including either a pulse representing a binary ONE or no pulse representing a binary ZERO, has been applied to shift register 334, the shift register is enabled to determine whether the system is to be halted while the student answers a question and whether the lesson is to be returned to an earlier segment should the student provide an incorrect answer. When a full complement of sixteen pulse periods has been applied to shift register 334, the first pulse, of the pulse period, which also passed from amplifier 320 as the system clock pulse, will have reached stage A of shift register 334. The output of stage A is applied to the noninhibited input of INHIBITED-AND gate 336 and to one input of AND gate 338. The second pulse of the train, which is in stage B of shift register 334, is the video frame keying pulse and is not utilized within the shift register. The third pulse of the train in stage C is utilized to indicate whether the system is to be halted to permit the student to answer a question. The output from stage C, is applied to the inhibiting input of gate 336 and to the second input of AND gate 338. Thus, if there are pulses in stages A and C, gate 336 is blocked while gate 338 provides an output which sets flip-flop 340. If there is no question, then there is no pulse in stage C, and so gate 338 is blocked while gate 336 applies a signal through OR gate 339 to clear all the stages of shift register 334. The set output of flip-flop 340 energizes indicator 342 to indicate to the student that he is to provide an answer to a question. By way of examples, this question may be displayed on the associated video display device or it may have been included in the audio output which preceded the A and C control pulses or it may be in a work book used in conjunction with the recorded lessor. The output from flip-flop 340 is also applied through OR gate 343 to the second input of OR gate 310, and to the muting input of amplifier 284. In addition the flip-flop output from gate 343 is passed to the second inhibiting input of gate 298. Thus, this output from flip-flop 340 inhibits the provision of the audio output and blocks the changing of the video output. The output from flip-flop 340 additionally activates delay circuit 344 which provides a ten-second output signal through OR gate 343 to OR gate 310 and to the inhibiting input of gate 298. This ensures that the pause introduced by the asking of a question has a duration of ten seconds. Should the student not have provided an answer within that time, the continued set output from flip-flop 340 would again actuate delay circuit 344 to extend the pause condition for another ten second interval. This ten second pause ensures that when the system continues in operation it is at a proper point in the message segment. Should the equipment be at an earlier point in the ten second segment, the question and its pause would be repeated. The output from flip-flop 340 is also connected to inverter 341 which has its output coupled by differentiating circuit 345 to OR gate 330. Consequently, when flip-flop 340 is reset, indicating that the pause for answering a question has terminated, shift register 334 is cleared. PAUSE control 308 is also connected to the noninhibiting input of INHIBITED-AND gate 347 which has its inhibiting input connected to the output of flip-flop 340. Thus, when the student depresses PAUSE control 308, except while the system is halted for the answering of a question, shift register 334 is cleared. Therefore, should an A pulse and a C pulse have entered shift register 334 but not yet have reached stages A and C, these pulses are cleared by activation of PAUSE control 308 and so do not shift through the register to cause a pause due to the setting of flip-flop 340. Since the message steps back one segment upon release of PAUSE control 308, these pulses will again be introduced into shift register 334 and this question will not be missed.

The student is provided with four controls 346*a* through 346*d*, such as push-buttons, with which to indicate his answer to the question. Each control is connected to one input of a corresponding and uniquely associated AND gate 348*a* through 348*d* and to one input of OR gate 350. The fifth and sixth pulse positions of the pulse period, which are within shift register stages E and F, are utilized to indicate in binary coded form the correct answer to the question, and the outputs from stages E and F are provided to gates 348*a* through 348*d* to result in an output from one of those gates only in the event the student actuates the one control 346*a* through 346*d* corresponding to the correct answer. Thus, for example, if E indicates a binary one in stage E while $\bar{E}$ indicates a binary zero, in stage E, and F indicates a one in stage F while $\bar{F}$ indicates a zero in stage F, then gate 348*a* can be provided with inputs E and $\bar{F}$, gate 348*b* can be provided with inputs $\bar{E}$ and F, gate 348*c* can be provided with inputs E and F and gate 348*d* can be provided with inputs $\bar{E}$ and $\bar{F}$, corresponding to binary representations of one, two three and four, respectively. Thus, when the student is to provide an answer, one and only one of the gates 348*a* through 348*d* is enabled to pass the signal resulting from actuation by the student of one of the controls 346*a* through 346*d*. If the student depresses the correct control, then a signal from the enabled gate 348*a* through 348*d* passes through OR gate 352 to AND gate 354 and to the inhibiting input of INHIBITED-AND gate 356. Simultaneously, in response to actuation of any of the controls 346*a* through 346*d*, a signal is passed through OR gate 350 to the noninhibited input of gate 356. Gates 354 and 356 also receive inputs from flip-flop 340 when the system is halted for a question. Thus, if the student has depressed the one control 346*a* through 346*d* indicating the correct answer, a signal is applied from gate 354, whereas if the student has depressed a control indicating a wrong answer a signal is provided from the output of gate 356.

The output of gate 354 energizes indicator 358 to indicate to the student that he has selected the correct answer and passes through OR gate 360 to reset flip-flop 340, thus terminating the pause condition. The output of gate 356 energizes indicator 362 to indicate to the student that he has selected an incorrect answer and is applied to one input of AND gate 364. If the equipment is going to return to a different segment of a lesson with another one of the four subchannels in response to the incorrect answer, then the fourth control pulse, which is within stage D of shift register 334, enables gate 364, and so in response to the input to gate 364 from gate 365 a signal passes through OR gate 360 to reset flip-flop 340, ending the pause condition and permitting the lesson to continue in the segment to which it has been returned. If the equipment is not going to return to a previous segment of the lesson, gate 364 is blocked, and so the pause condition continues until the student depresses the control 346*a*–346*d* indicating the correct answer.

The output from stages A, C and D of shift register 334 are also applied as inputs to AND gate 366 which receives at its fourth input the output of gate 356, indicating that the student has selected an incorrect answer. As a result gate 366 applies a signal to BCD counters 260 and 262 loading into those counters the number of the message segment to which the message is to be returned to permit the student to review the material from which the right answer can be obtained. This segment number is contained within the ninth through the sixteenth control pulses which are stored in stages I through P of shift register 334, and these shift register stages have their outputs connected as inputs to BCD counters 260 and 262.

The clock pulse from clock 320, occurring once each 33⅓ milliseconds, is applied to one input of comparison circuit 368. Pulses from oscillator 370 pass through INHIBITED-AND gate 372 in its noninhibited condition to drive shift register 334. The output from flip-flop 340, which causes the pause during the time the student is to answer a question, is applied to the inhibiting input of gate 372 to block the drive pulses from shift register 334 during that pause condition. In addition, the pulses from oscillator 370 are applied at a 960 pulse per second rate to dividing circuit 376 which divides the pulse rate by thirty-two to provide output pulses at the same rate as the clock pulses from gate 318. These pulses from dividing circuit 376 are supplied to ramp generator 378 which generates a signal of a level dependent upon the number of pulses received. As an illustration, an output of minus 5 volts can be provided for 15 ms, then a transition to plus 5 volts can take place over the next 3⅓ ms during which time the sampling is expected, and finally an output of plus 5 volts can be given for 15 ms, followed upon the transition in the input voltage applied from dividing circuit 376 to ramp generator 378 by a rapid transition back to minus five volts. This signal from ramp generator 378 is supplied to the second input of comparison circuit 368, the output of which is connected to the control input of oscillator 370. As a consequence, should there be any phase difference between the clock pulses from amplifier 320 and the pulses from oscillator 370, comparison circuit 368 adjusts the oscillator 370 output to bring the two signals into the proper phase relationship.

If the system is to be used in conjunction with a standard television receiver as an output display device so that several subchannels of audio signal can be included on each channel devoted to audio, mixer 252 selects the desired audio subchannel. Controls 380*a* through 380*d* permit the user to designate the desired subchannel. The actuated control 380*a*–380*d* causes binary code generator 382 to provide on its output lines 384 and 386 a binary coded indication of the desired subchannel. Output lines 384 and 386 are connected to the first set of fixed terminals of double-pole-double-throw (DPDT) switch 388, the moving contacts of which are connected to the inputs of decoder/driver circuit 390. In response to that binary coded signal from circuit 382, decoder/driver circuit 390 energizes a corresponding relay coil 392*a* through 392*d*, closing the corresponding relay contact 394*a* through 394*d* to connect a corresponding crystal 396*a* through 396*d* in the circuit of crystal controlled oscillator 398. The output frequency controlled oscillator 398. The output frequency from oscillator 398 is thus determined by the actuated one of the switches 380*a* through 380*d*. This oscillator output is applied to the second input of mixer 252, and the resulting sum or difference signal, being the desired subchannel signal, passes through filter 254 to amplifier 256 and the remainder of the control unit.

If the message is longer than the 16 minutes and 40 seconds (1,000 seconds) which can be contained in one multiplexed message, the subchannel selection circuitry can be utilized to extend the message. Thus, DPDT switch 388 has its second set of fixed contacts connected to the outputs from binary counter 400. Counter 400 is reset to a binary zero when START control 300 is actuated. Should the message extend more than one hundred of the ten-second segments, the carry output from BCD counter 262 is applied to the UP input of counter 400, transferring the system to the next audio subchannel. Likewise, the borrow output from counter 262 is connected to the DOWN input of counter 400 should the student reverse the system. In addition, the outputs of stages G and H of shift register 334 are applied as inputs to counter 400 when gate 366 loads a segment number into BCD counters 260 and 262, and so should a wrong answer to a question cause the system to return to a point in the lesson contained in a different subchannel, that subchannel is automatically obtained.

FIG. 7 depicts the control unit in considerable detail for ease of understanding, and a small decrease in the total number of components could perhaps be achieved by design optimumization. Thus, for example gate 366 could be eliminated, and the output from gate 364 utilized to load into BCD counters 260 and 262 the segment number contained in stages I-P of shift register 334.

Likewise, alternative types of multiplexing other than frequency multiplexing could be utilized, for example pulse sampling of the digital or analog voltage of each segment at a rate greater than the bandwidth of the information within the segments. Additionally, other recording means than disc recorders could be utilized, for example drum recorders or laser or electron beam recording on film media.

It is thus seen that the present invention is capable of providing extremely flexible equipment permitting multiple access to stored messages with the ability to interrogate the user and shift messages or locations within the message in response to answers provided by the user. Although the present invention has been described with reference to preferred embodiments, numerous modifications and rearrangements could be made, and still the result would come within the scope of the invention.

What is claimed is:

1. An information storage and retrieval system comprising a. a first multi-channel recorder for recording a message in a first plurality of equal length message segments on separate channels and for playing back simultaneously from the separate channels the first plurality of message segments;

b. a first multiplexer connected to said first multi-channel recorder for multiplexing the first plurality of message segments into a multiplexed message portion;

c. a second multi-channel recorder for recording a second plurality of multiplexed message portions on separate channels and for playing back simultaneously from the separate channels the second plurality of message portions;

d. a second multiplexer connected to said second multi-channel recorder for multiplexing the second plurality of multiplexed message portions into a multiplexed message signal;

e. demultiplexing means for demultiplexing the multiplexed message signal into the plurality of equal length message segments;

f. output means for providing an output signal of the message and including control means coupling said output means with said demultiplexing means for applying each message segment in turn to the output means; and g. further recording means coupled to said second multiplexer for recording the multiplexed message signal.

2. An information storage and retrieval system as claimed in claim 1 in which said further recording means is an audio signal recorder for recording audio messages and in which the system further comprises a video recorder for recording video messages.

3. An information storage and retrieval system as claimed in claim 2 in which said control means includes means for adjusting said output means to any desired segment of the plurality of equal length message segments.

4. An information storage and retrieval system as claimed in claim 3 in which said output means includes an audio output device for providing an audio output signal of recorded audio messages and a video output device for providing a video output signal of recorded video messages.

5. An information storage and retrieval system as claimed in claim 4 in which said video output device includes a video buffer for storing a video signal and a video display device for displaying the stored video signal.

6. A multiple access information retrieval system comprising a plurality of message receiving locations and message source means for providing each message receiving location a plurality of equal length sequentially numbered message segments multiplexed into a multiplexed message signal of a duration equal to the message segment length, each message receiving location including message output means and message control means coupling the message source means with the message output means of that message receiving location for applying each message segment in turn to the message output means commencing with a preselected one of the message segments, each said message control means comprising a first mixer for receiving multiplexed message signals, a binary coded decimal counter for generating voltage signals that are digital representations of decimal message segment numbers, a digital-to-analog converter connected to said binary coded decimal counter for converting the voltage signals to oscillator control voltage signals, first signal generating means responsive to coded control signals in the multiplexed message signal for incrementing the binary coded decimal counter voltage signals at the end of each segment of the multiplexed message signal, voltage controlled oscillator means coupled to said digital-to-analog converter and to said first mixer for controlling the frequency of said voltage controlled oscillator to apply to the said first mixer a first control signal of a frequency which when mixed with the multiplexed message signal results in a first heterodyne signal including a preselected one of the message segments, and first filter means coupled to said first mixer for passing the preselected one of the message segments while blocking other signal frequencies.

7. A multiple access information retrieval system as claimed in claim 6 further comprising second signal generating means responsive to coded control signals in the multiplexed message signal for generating control pulses, pulse storage means for storing control pulses, third signal generating means for generating a suspending signal in response to a predetermined arrangement of control pulses in said pulse storage means, inhibiting means for inhibiting said first signal generating means upon generation of a suspending signal, a plurality of actuation means, and terminating means for terminating operation of the inhibiting means upon actuation of a preselected one of the plurality of actuation means.

8. A multiple access information storage system as claimed in claim 7 in further comprising counter setting means for setting the binary coded decimal counter to a predetermined voltage signal upon actuation of one of the plurality of actuation means other than said preselected one while said first signal generating means is inhibited.

9. A multiple access information retrieval system comprising a plurality of message receiving locations and message source means for providing to each message receiving location a plurality of equal length, sequentially numbered message segments multiplexed into a multiplexed message signal of a duration equal to the message segment length, each message receiving location including message output means and message control means coupling the message source means with the message output means of that message receiving location for applying each message segment in turn to the message output means commencing with a preselected one of the message segments, each said message control means comprising:

a first mixer for receiving multiplexed message signals;

first control signal means for applying to the said first mixer a first control signal of a frequency which when mixed with the multiplexed message signal results in a first heterodyne signal including a preselected group of the message segments, said first control signal means including first frequency control means for controlling the frequency of the first control signal and first filter means coupled to said first mixer for passing the preselected group of the message segments while blocking other signal frequencies;

a second mixer for receiving the preselected group of message segments; and second control signal means for applying to said second mixer a second control signal of a frequency which when mixed with the preselected group of message segments results in a second heterodyne signal including a preselected one of the message segments, said second control signal means including second frequency control means for controlling the frequency of the second control signal and second filter means coupled to said second mixer for passing the preselected one of the message segments while blocking other signal frequencies.

10. A multiple access information storage system as claimed in claim 9 in which said first control signal means comprises crystal controlled oscillator means including a plurality of crystals of different frequency characteristics, and connecting means for selectively connecting one of the plurality of crystals into the oscillation circuit of said crystal controlled oscillator means.

11. A multiple access information storage system as claimed in claim 10 in which said connecting means includes a like plurality of switch means each uniquely associated with one of said crystals and capable of alternatively assuming a first condition in which the associated crystal is disconnected from the oscillation circuit and a second condition in which the associated crystal is connected into the oscillation circuit, and switch control means for selectively controlling each of said plurality of switch means between the first condition and the second condition.

12. A multiple access information storage system as claimed in claim 11 in which said switch control means includes means responsive to coded control signals in the multiplexed message signal for electively controlling each of said plurality of switch means between the first condition and the second condition.

13. An information storage and retrieval system comprising:

a. time segmenting means for dividing a message of duration $T$ into $N$ message segments, each message segment having a duration $t$, where $T = Nt$, said time segmenting means comprising a first multichannel recorder for recording the message in a first plurality of equal length message segments on separate channels and for playing back simultaneously from the separate channels the first plurality of message segments;

b. multiplexing means for multiplexing the $N$ message segments into a multiplexed message signal having a duration $t$, said multiplexing means including a first multiplexer connected to said first multichannel recorder for multiplexing the first plurality of message segments into a multiplexed message portion; a second multi-channel recorder for recording a second plurality of multiplexed message portions on separate channels and for playing back simultaneously from the separate channels the second plurality of message portions; and a second multiplexer connected to said second multichannel recorder for multiplexing the second plurality of multiplexed message portions into a multiplexed message signal;

c. demultiplexing means for demultiplexing the multiplexed message signal into the $N$ message segments; and d. output means for providing an output signal of the message and including control means coupling said output means with said demultiplexing means for applying each of the $N$ message segments in turn to the output means.

14. An information storage and retrieval system as claimed in claim 13 further comprising further recording means coupled to said second multiplexer for recording the multiplexed message signal.

15. An information storage and retrieval system as claimed in claim 14 in which said further recording means is an audio signal recorder for recording audio messages and in which the system further comprises a video recorder for recording video messages.

16. An information storage and retrieval system as claimed in claim 13 and including a plurality of output means each providing an output signal of the message and having control means coupling the associated output means with said demultiplexing means for applying each message segment in turn to that output means.

17. An information storage and retrieval system as claimed in claim 16 and including a plurality of demultiplexing means each uniquely associated with one of said plurality of output means for demultiplexing the multiplexed message signal into the plurality of equal length message segments under control of the control means in the associated output means.

18. An information storage and retrieval system comprising:

a. time segmenting means for dividing a message of duration $T$ into $N$ message segments, each message segment having a duration $t$, where $T = Nt$;
b. multiplexing means for multiplexing the $N$ message segments into a multiplexed message signal having a duration $t$;
c. demultiplexing means for demultiplexing the multiplexed message signal into the $N$ message segments; and
d. output means for providing an output signal of the message and incuding an audio output device for providing an audio output signal of recorded audio message, a video output device for providing a video output signal of recorded video messages and control means coupling said output means with said demultiplexing means for applying each of the $N$ message segments in turn to the output means.

19. An information storage and retrieval system as claimed in claim 18 in which said video output device includes a video buffer for storing a video signal and a video display device for displaying the stored video signal.

20. An information storage and retrieval system as claimed in claim 18 and including a plurality of output means providing an output signal of the message and having control means coupling the associated output means with said demultiplexing means for applying each message segment in turn to that output means.

21. An information storage and retrieval system as claimed in claim 20 and including a plurality of demultiplexing means each uniquely associated with one of said plurality of output means for demultiplexing the multiplexed message signal into the plurality of equal length message segments under control of the control means in the associated output means.

22. A multiple access information retrieval system comprising a plurality of message receiving locations and message source means for providing to each message receiving location $N$ message segments each having a duration $t$, said message segments multiplexed into a multiplexed message signal of a duration $t$, each message receiving location including message output means and message control means coupling the message source means with the message output means of that message receiving location for applying each message segment in turn to the message output means commencing with a preselected one of the message segments to provide an output message of a duration $T$ where $T = Nt$, each message control means comprising a first mixer for receiving multiplexed message signals, first control signals means for applying to said first mixer a first control signal of a frequency which when mixed with the multiplexed message signal results in a first heterodyne signal including a preselected one of the message segments, said first control signal means including first frequency control means for controlling the frequency of the first control signal, and first filter means coupled to said first mixer for passing the preselected one of the message segments while blocking other signal frequencies.

23. A multiple access information retrieval system as claimed in claim 22 in which said first control signal means comprises voltage controlled oscillator means, variable voltage source means coupled to said voltage controlled oscillator means for controlling the frequency thereof, and voltage control means for controlling the voltage of the variable voltage source means.

24. A multiple access information retrieval system as claimed in claim 23 in which said voltage control means comprises a binary coded decimal signal source and in which said variable voltage source means comprises a digital-to-analog converter for providing to said voltage controlled oscillator means a voltage signal at a level determined by the output of said binary coded decimal signal source.

25. An information storage and retrieval system comprising:

a. time segmenting means for dividing a message of duration $T$ into $N$ message segments, each message segment having a duration $t$, where $T = Nt$;
b. multiplexing means for multiplexing the $N$ message segments into a multiplexed message signal having a duration $t$;
c. a plurality of output means each providing an output signal of the message and having control means for applying each message segment in turn to that output means, said control means including means for adjusting said output means to any desired segment of the plurality of equal length message segments; and
d. a plurality of demuliplexing means each uniquely associated with one of said plurality of output means for demultiplexing the multiplexed message signal into the $N$ message segments under control of the control means of the associated output means.

* * * * *